United States Patent [19]
Kawaji et al.

[11] Patent Number: 5,908,727
[45] Date of Patent: Jun. 1, 1999

[54] BINDER AND TONER FOR DEVELOPING ELECTROSTATIC IMAGE CONTAINING THE SAME

[75] Inventors: Hiroyuki Kawaji; Shinichi Sata; Yasuhiro Hidaka, all of Wakayama, Japan

[73] Assignee: Kao Corporation, Tokyo, Japan

[21] Appl. No.: 08/901,210

[22] Filed: Jul. 25, 1997

[30] Foreign Application Priority Data

Jul. 25, 1996 [JP] Japan ..................................... 8-215514

[51] Int. Cl.$^6$ ...................................................... G03G 9/097
[52] U.S. Cl. ........................... 430/110; 430/111; 523/206; 525/55
[58] Field of Search ...................................... 430/110, 111

[56] References Cited

U.S. PATENT DOCUMENTS 5,391,695  2/1995  Kawabe et al. ........................ 430/111
5,483,016  1/1996  Aoki et al. ............................. 430/109

FOREIGN PATENT DOCUMENTS 41-42301  5/1992  Japan .
70-98517  4/1995  Japan .

*Primary Examiner*—Roland Martin
*Attorney, Agent, or Firm*—Birch, Stewart, Kolasch & Birch, LLP

[57] ABSTRACT

A binder obtained by a process having the steps of mixing components (a) to (c): (a) a starting material monomer mixture of two different polymerization reactions, each of the polymerization reactions being carried out in an independent reaction path; (b) a compound which can react with both of the starting material monomers of the two different polymerization reactions; and (c) a releasing agent; and carrying out both of the two different polymerization reactions in one reaction vessel. A toner for developing an electrostatic image including the above binder.

10 Claims, No Drawings

BINDER AND TONER FOR DEVELOPING ELECTROSTATIC IMAGE CONTAINING THE SAME

BACKGROUND OF THE INVENTION

1. Field of the Invention

The present invention relates to a toner for developing an electrostatic image used for development of electrostatic latent images in electrophotography, electrostatic recording, electrostatic printing, and the like, and a binder usable for the above toner.

2. Discussion of the Related Art

As disclosed in U.S. Pat. Nos. 2,221,776, 2,297,691 and 2,357,809 and other publications, conventional electrophotography which can be used for apparatus for forming fixed images, such as laser printers and dry-type electrostatic copy machines, comprises the steps of evenly charging a photoconductive insulating layer (a charging process); and subsequently exposing the layer to eliminate the charge on the exposed portion to thereby form an electrostatic latent image (an exposing process); visualizing the formed image by adhering colored charged fine powder known as a toner to the latent image (a developing process); transferring the obtained visible image to an image-receiving sheet such as a transfer paper (a transfer process); and permanently fixing the transferred image by heating, pressure application or other appropriate means of fixing (a fixing process).

Among such processes, the fixing processes include contact heat-fixing methods, such as heat roller fixing methods, and non-contact heat-fixing methods, such as oven fixing methods. Since the contact heat-fixing methods are featured in having good thermal efficiency, the temperature required for fixing can be notably lowered as compared to the non-contact heat-fixing methods, thereby making it effective in conserving energy and miniaturizing copy machines. However, in the contact heat-fixing method, there arises such a problem so-called "offset phenomenon," wherein the toner is adhered to the surface of the heat roller, and thus transferred to a subsequent transfer paper.

In order to inhibit this phenomenon, the surface of a heat roller have been conventionally coated with a material excellent in release properties, such as a fluororesin, or a releasing agent such as a silicone oil may be applied on the surface of a heat roller. However, the method of applying a silicone oil necessitates a fixing device which is larger-scaled and complicated, making it expensive, which in turn may undesirably bring about various problems.

Conventionally, vinyl resins as typically represented by styrene-acrylic copolymers have been used for these kinds of toners. In the cases where the vinyl resins are used, when the offset resistance is intended to be improved, the softening points and the crosslinking densities of the resins have to be inevitably made higher, thereby rather making the low-temperature fixing ability poor. On the other hand, when the low-temperature fixing ability is overly prioritized, there arise problems in the offset resistance and the blocking resistance.

As disclosed in Japanese Patent Laid-Open No. 49-65232, 50-28840 and 50-81342, methods for adding paraffin waxes, low-molecular polyolefins, and the like as offset inhibitors in the process of toner making have been known. In these references, however, there arise such problems that when the amount of the offset inhibitors added is too small, sufficient effects cannot be achieved by the addition thereof, and that when the amount is too large, the resulting developer undergoes rapid deterioration. Also, when the waxy components are added during the process of toner making and blended strongly to give a uniform dispersion, since a polymer chain of the resins are liable to be broken, uniform dispersion of the waxy components while maintaining the properties inherently owned by the resins cannot be easily performed.

On the other hand, as for the binder resins for toners, polyester resins having excellent low-temperature fixing ability have been particularly used. The polyester resins have inherently good fixing ability, and as disclosed in U.S. Pat. No. 3,590,000, the toner using it can be sufficiently fixed even by a non-contact fixing method. However, since the offset phenomenon is likely to take place, it has been difficult to use these polyester resins in the heat roller fixing method. Japanese Patent Laid-Open Nos. 50-44836, 57-37353 and 57-109875 discloses polyester resins with improved offset resistance by using polycarboxylic acids. In these methods, the polyester resins still do not have good offset resistance for practical purposes. However, even if a good offset resistance is achieved, the low-temperature fixing ability inherently owned by the polyester resins is in turn becomes poor, and the pulverizability of the resin itself and that of the toner become extremely poor.

In order to solve the above problems, the following methods for blending polyester resins having excellent fixing ability with styrene-acrylic resins have been known. For instance, examples of such methods include:

(1) Methods for blending polyester resins with styrene-acrylic resins (see Japanese Patent Laid-Open Nos. 49-6931, 54-114245, 57-70523, and 2-161464);

(2) Methods for chemically binding polyester resins with styrene-acrylic resins (see Japanese Patent Laid-Open No. 56-116043);

(3) Methods for copolymerizing unsaturated polyesters with vinyl monomers (see Japanese Patent Laid-Open Nos. 57-60339, 63-279265, 1-156759 and 2-5073);

(4) Methods for copolymerizing polyester resins having an (meth)acryloyl group with vinyl monomers (see Japanese Patent Laid-Open No. 59-45453);

(5) Methods for copolymerizing reactive polyesters with vinyl monomers in the presence of polyester resins (see Japanese Patent Laid-Open No. 2-29664); and (6) Methods for forming a block copolymer by binding polyester resins and vinyl resins with an ester bond (see Japanese Patent Laid-Open No. 2-881).

However, since the polyester resins have inherently poor compatibility with the styrene-acrylic resins, mere mechanical blending of the components may result in poor image quality evaluation owing to such troubles as background in the formed images depending upon the blending ratios. This is because the dispersion of the resins and the internal additives such as carbon black become poor, thereby causing uneven triboelectric charges. Also, in the cases where the polyester resins and the styrene-acrylic resins have different molecular weights, the melt viscosities of the two resins are likely to differ, thereby making it difficult to have small particle sizes of the dispersed resins constituting the dispersed domains. Therefore, when such resins are used for toner making, the dispersion of the internal additives, such as carbon blacks, in the toner are extremely poor, and thereby the resulting toner drastically lacks image-forming stability. Further, in the case where the reactive polyesters are copolymerized with the vinyl monomers, it is applicable only in a restricted compositional range in order not to allow gelation.

In view of the above problems, the present inventors have developed a developer composition, which is used as a developer having both good low-temperature fixing ability and offset resistance, using a binder resin prepared by the steps of blending in advance a starting material monomer mixture of two different polymerization reaction, each of the polymerization reactions being carried out in an independent reaction path in one reaction vessel, and concurrently carrying out the two different polymerization reactions (Japanese Patent Laid-Open No. 4-142301, corresponding to U.S. Pat. No. 5,391,695).

Also, the present inventors have developed a method for producing a binder resin, further comprising the step of adding a compound which can react with both of the starting material monomers of the two different polymerization reactions in the above polymerization reaction, to thereby improve the dispersibility of the resins (Japanese Patent Laid-Open No. 7-98517, corresponding to U.S. Pat. No. 5,483,016).

However, even if resins comprising the polyester resins and the styrene resins suitably dispersed in the polyester resins were prepared by the above methods, the following limitations were posed owing to the fact that the vinyl resin constituting the dispersed domains has a narrow molecular weight distribution. In the case where the molecular weight of the vinyl resin is made low, only the fixing ability is improved but the improvement of the offset resistance is a limited. On the other hand, in the case where the molecular weight is made high, only the offset resistance is improved, but the improvement in lowering the fixing temperature is limited.

In addition, a method for producing a binder resin comprising a blend of two kinds of resins having different softening points has been developed (Japanese Patent Laid-Open No. 4-362956). Even in this method, as the blending proportion of the resin having a lower softening point is increased, the fixing ability becomes good, though the blocking resistance is undesirably small. On the other hand, as the glass transition temperature of the resin having a lower softening point is made higher, the problems in the blocking resistance are eliminated, though the improvement in the fixing ability becomes undesirably small even when the proportion added is increased. Therefore, in view of the recent demands for high speed, miniaturization, and conserved energy, further improvements in the low-temperature fixing ability and the offset resistance are desired.

An object of the present invention is to provide a binder for producing a toner having particularly good low-temperature fixing ability and offset resistance.

Another object of the present invention is to provide a toner for developing an electrostatic image comprising the binder.

These and other objects of the present invention will be apparent from the following description.

SUMMARY OF THE INVENTION

The present invention is concerned with the following:
(1) A binder obtained by a process comprising the steps of: mixing components (a) to (c):
  (a) a starting material monomer mixture of two different polymerization reactions, each of the polymerization reactions being carried out in an independent reaction path;
  (b) a compound which can react with both of the starting material monomers of the two different polymerization reactions; and
  (c) a releasing agent; and
carrying out both of the two different polymerization reactions in one reaction vessel;

(2) The binder described in item (1) above, wherein the two different polymerization reactions are respectively reactions for preparing a condensation polymerization resin and an addition polymerization resin;

(3) The binder described in item (1) above, wherein the component (b) is a compound having an ethylenic unsaturated bond and at least one functional group selected from the group consisting of a hydroxyl group, a carboxyl group, an epoxy group, a primary amino group, and a secondary amino group;

(4) The binder described in item (3), wherein the component (b) is represented by the general formula (I):

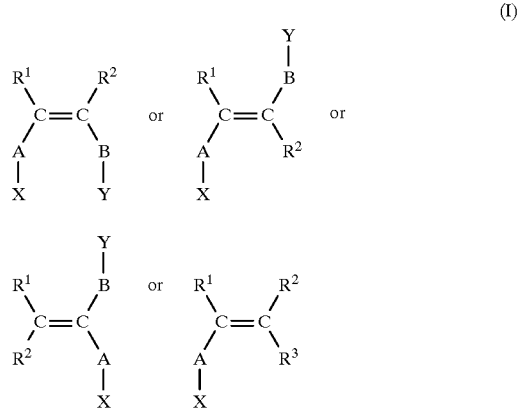

wherein $R^1$, $R^2$ and $R^3$, which may be identical or different, each represents a hydrogen atom, a hydroxyl group, a halogen atom, an alkyl group, an alkoxyl group, an aryl group, or a vinyl group, wherein $R^1$ and $R^2$ or $R^2$ and $R^3$ may together form a ring, each of the alkyl group, the alkoxyl group, the aryl group, the vinyl group, or the ring being substituted or unsubstituted; A and B, which may be identical or different, each represents a single bond, an alkylene group represented by the following general formula (II), or a phenylene group represented by the following general formula (III):

wherein $R^4$, $R^5$ and $R^6$, which may be identical or different, each represents a hydrogen atom, a hydroxyl group, a halogen atom, an alkyl group, an alkoxyl group, an aryl group, or a vinyl group, wherein $R^4$ and $R^5$ may together form a ring, each of the alkyl group, the alkoxyl group, the aryl group, the vinyl group, or the ring being substituted or unsubstituted; $R^7$ is a single bond or a lower alkylene group; m is an integer of 0 to 5; and n is an integer of 0 to 2, and wherein X and Y, which may be identical or different, each represents $-R^8$, $-OR^9$, or $-COOR^{10}$, wherein $R^8$, $R^9$, and $R^{10}$ each represents a hydrogen atom or a substituted or unsubstituted lower alkyl group;

(5) The binder described in item (1), wherein said releasing agent is at least one member selected from polypropylene waxes, polyethylene waxes, polypropylene-polyethylene copolymer waxes, ester waxes, and amide waxes;

(6) The binder described in item (1), wherein the releasing agent has a softening point of from 70° to 160° C.;

(7) The binder described in item (1), wherein an amount of the releasing agent is used in an amount of from 0.1 to 1000 parts by weight, based on 100 parts by weight of a total amount of the components (a) and (b);

(8) The binder described in item (1), wherein the binder has an acid value of 30 KOH mg/g or less;

(9) The binder described in item (1), wherein the binder has a softening point of from 70° to 160° C; and

(10) A toner for developing an electrostatic image comprising the binder of any one of items (1) to (9).

DETAILED DESCRIPTION OF THE INVENTION

The present invention will be explained in detail below.

The binder of the present invention is obtained by a process comprising the steps of:

mixing components (a) to (c):
(a) a starting material monomer mixture of two different polymerization reactions, each of the polymerization reactions being carried out in an independent reaction path;
(b) a compound which can react with both of the starting material monomers of the two different polymerization reactions (hereinafter simply referred to as a "dually reactive compound"); and
(c) a releasing agent; and carrying out both of the two different polymerization reactions in one reaction vessel.

The binder of the present invention has the following construction: The starting material monomers of the two different polymerization reactions are the constituting units, and the resinous components formed by the two different polymerization reactions are partially chemically bonded via a dually reactive compound; and the releasing agent is substantially uniformly dispersed in the binder. The above releasing agent has an average size of dispersed particles of preferably 5 $\mu$m or less, particularly 4 $\mu$m or less. In the present invention, the term "particle size of the dispersed particles" refers to an average size of dispersed of a releasing agent dispersed in the resin. Here, the particle size of the dispersed particles can be measured by the method comprising the steps of slicing the resin having a particle size of 0.2 mm using a microtome to a thickness of 150 nm, observing the obtained thin slices using a transmission scanning electron microscope ("JEM-2000," manufactured by JEOL (Nihon Denshi Kabushiki Kaisha)), and then analyzing observed images by a known method. Incidentally, in cases where ester waxes are used as releasing agents, since the ester waxes have excellent compatibility with the resin in the binder, the releasing agents in a particle form may not be observed.

In the present invention, the two different polymerization reactions are each carried out in an independent reaction path, and it is preferred that the two different polymerization reactions are respectively reactions for preparing a condensation polymerization resin and an addition polymerization resin. Typical examples of the condensation polymerization reaction resins include one or more members selected from polyesters, polyesteramides, and polyamides, and typical examples of the addition polymerization reaction resins include vinyl resins obtained by radical polymerization reaction.

Among them, the polyester components can be formed by condensation polymerization between starting material monomers of a dihydric alcohol component or trihydric or higher polyhydric alcohol component and a carboxylic acid component, such as a dicarboxylic acid component, a tricarboxylic or higher polycarboxylic acid, carboxylic acid anhydrides thereof, and carboxylic acid esters thereof.

Examples of the dihydric alcohol components include bisphenol A alkylene oxide adducts such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxyethylene(2.2)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and other dihydric alcohol components.

Examples of the trihydric or higher polyhydric alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and other trihydric or higher polyhydric alcohol components.

Among these dihydric alcohol components and trihydric or higher polyhydric alcohol components, preference is given to bisphenol A alkylene oxide adducts, ethylene glycol, 1,2-propylene glycol, 1,3-propylene glycol, and neopentyl glycol.

In the present invention, these dihydric alcohol components and trihydric or higher polyhydric alcohol components may be used singly or in combination.

Also, examples of the dicarboxylic acid components include dicarboxylic acids, such as maleic acid, fumaric acid, citraconic acid, itaconic acid, glutaconic acid, phthalic acid, isophthalic acid, terephthalic acid, succinic acid, adipic acid, sebacic acid, azelaic acid, malonic acid; alkyl- or alkenyl-substituted succinic acids, the alkyl group having 1 to 20 carbon atoms or the alkenyl group having 2 to 20 carbon atoms, such as n-dodecenyl succinic acid, isododecenyl succinic acid, n-dodecyl succinic acid, isododecyl succinic acid, n-octenyl succinic acid, n-octyl succinic acid, isooctenyl succinic acid, isooctyl succinic acid, and acid anhydrides thereof, alkyl esters thereof, the alkyl group having 1 to 12 carbon atoms, and other dicarboxylic acid components. Among these dicarboxylic acid components, preference is given to maleic acid, fumaric acid, terephthalic acid, and alkenyl-substituted succinic acids, the alkenyl group having 2 to 20 carbon atoms.

In the present invention, tricarboxylic or higher polycarboxylic acids or derivatives thereof may be used. Examples of the tricarboxylic or higher polycarboxylic acid components include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, and acid anhydrides thereof, alkyl esters thereof, the alkyl moiety having 1 to 12 carbon atoms, and other tricarboxylic or higher polycarboxylic acid components. Among these tricarboxylic or higher polycarboxylic acid components, in particular, 1,2,4-benzenetricarboxylic acid, namely trimellitic acid, or a derivative thereof is preferably used because it is inexpensive and the reaction control is easy.

The tricarboxylic or higher polycarboxylic acid component is effective in controlling the degree of polymerization of the condensation polymerization resin, and the amount thereof is preferably from 0.2 to 30% by weight, particularly from 0.5 to 30% by weight to the starting material monomers of condensation polymerization.

When the amount of the tricarboxylic or higher polycarboxylic acid component is smaller than the upper limit specified above, the gelation is likely to be inhibited during the polymerization reaction. On the other hand, when the amount is larger than the lower limit specified above, the offset phenomenon, wherein a part of the toner is adhered to the surface of the heat roller, and thus transferred to a subsequent transfer paper, is likely to be inhibited.

In the process of forming the polyester components, esterification catalysts, such as dibutyltin oxide, zinc oxide, stannous oxide, and dibutyltin dilaurate, can be suitably used.

The starting material monomers for forming amide components are necessary for the starting material monomers for forming polyesteramides or polyamides obtained by condensation polymerization reaction, aside from the starting material monomers listed above. Examples of the starting material monomers for forming amide components include polyamines such as ethylenediamine, pentamethylenediamine, hexamethylenediamine, diethylenetriamine, iminobispropylamine, phenylenediamine, xylylenediamine, and triethylenetetramine; amino carboxylic acids such as 6-aminocaproic acid and ε-caprolactam; and amino alcohols such as propanolamine. Among these starting material monomers for forming the amide components, preference is given to hexamethylenediamine and ε-caprolactam.

Incidentally, the starting material monomers listed above include some of which usually classified as ring-opening polymerization monomers. However, since these monomers also undergo condensation by hydrolysis in the presence of water formed in the condensation reaction of other monomers, they may be considered as starting material monomers of the condensation polymerization resin in a broad sense.

Typical examples of the monomers for forming the vinyl resins obtained by the addition polymerization in the present invention include styrene and styrene derivatives such as styrene, o-methylstyrene, m-methylstyrene, p-methylstyrene, α-methylstyrene, p-ethylstyrene, 2,4-dimethylstyrene, p-chlorostyrene, and vinylnaphthalene; ethylenic unsaturated monoolefins such as ethylene, propylene, butylene, and isobutylene; vinyl halides, such as vinyl chloride, vinyl bromide, and vinyl fluoride; vinyl esters, such as vinyl acetate, vinyl propionate, vinyl formate, and vinyl caproate; ethylenic esters such as methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl α-chloroacrylate, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, and diethylaminoethyl methacrylate; vinyl ethers such as vinyl methyl ether; vinylidene halides such as vinylidene chloride; and N-vinyl compounds such as N-vinylpyrrole and N-vinylpyrrolidone. In the present invention, among these starting material monomers of the vinyl resins, preference is given to styrene, α-methylstyrene, propylene, methyl acrylate, butyl acrylate, 2-ethylhexyl acrylate, stearyl acrylate, methyl methacrylate, butyl methacrylate, and 2-hydroxyethyl methacrylate.

The polymerization initiators may be used in the polymerization of the starting material monomers of the vinyl resins. Examples of the polymerization initiators include azo and diazo polymerization initiators such as 2,2'-azobis(2,4-dimethylvaleronitrile), 2,2'-azobisisobutyronitrile, 1,1'-azobis(cyclohexane-1-carbonitrile), and 2,2'-azobis-4-methoxy-2,4-dimethylvaleronitrile, and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide, dicumyl peroxide, and di-tert-butyl peroxide.

Also, the crosslinking agents generally employed in the preparation of vinyl resins may be optionally used.

For the purposes of controlling the molecular weight or molecular weight distribution of the polymer, or controlling the reaction time, two or more polymerization initiators may be used in combination.

The amount of the polymerization initiator used is preferably from 0.1 to 20 parts by weight, more preferably from 1 to 10 parts by weight, based on 100 parts by weight of the starting material monomers of the addition polymerization resins, such as the vinyl resins.

In the present invention, by lowering the number-average molecular weight of the resulting resins obtained in one of the reaction paths mentioned above, the pulverizability of the binders can be improved.

In particular, when the number-average molecular weight of the addition polymerization resin moiety is 11,000 or less, preferably from 2,000 to 10,000, the pulverizability of the resulting binder is effectively improved. In order to control the number-average molecular weight to 11,000 or less, a large amount of the polymerization initiators may be used, or a chain transfer agent may be used.

Also, in the present invention, the (b) dually reactive compound is used, and it is preferred that the dually reactive compound is a compound having an ethylenic unsaturated bond and at least one functional group selected from the group consisting of a hydroxyl group, a carboxyl group, an epoxy group, a primary amino group, and a secondary amino group. Among the above functional groups, preference is given to the hydroxyl group and the carboxyl group.

Concrete examples of the dually reactive compounds mentioned above include compounds having the ethylenic unsaturated bond and at least one functional group specified above, the compounds being represented by the general formula (I) shown below:

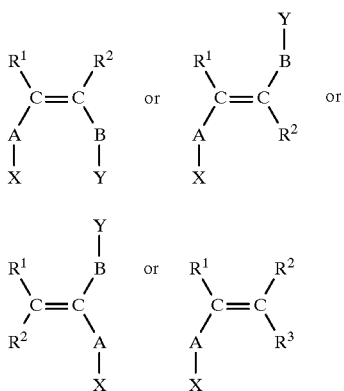

wherein $R^1$, $R^2$ and $R^3$, which may be identical or different, each represents a hydrogen atom, a hydroxyl group, a halogen atom, an alkyl group, an alkoxyl group, an aryl group, or a vinyl group, wherein $R^1$ and $R^2$ or $R^2$ and $R^3$ may together form a ring, each of the alkyl group, the alkoxyl group, the aryl group, the vinyl group, or the ring being substituted or unsubstituted; A and B, which may be identical or different, each represents a single bond, an alkylene group represented by the following general formula (II), or a phenylene group represented by the following general formula (III):

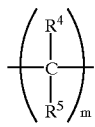 (II)

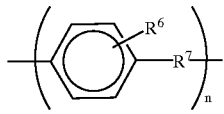 (III)

wherein $R^4$, $R^5$ and $R^6$, which may be identical or different, each represents a hydrogen atom, a hydroxyl group, a halogen atom, an alkyl group, an alkoxyl group, an aryl group, or a vinyl group, wherein $R^4$ and $R^5$ may together form a ring, each of the alkyl group, the alkoxyl group, the aryl group, the vinyl group, or the ring being substituted or unsubstituted; $R^7$ is a single bond or a lower alkylene group; m is an integer of 0 to 5; and n is an integer of 0 to 2, and wherein X and Y, which may be identical or different, each represents —$R^8$, —$OR^9$, or —$COOR^{10}$, wherein $R^8$, $R^9$, and $R^{10}$ each represents a hydrogen atom or a substituted or unsubstituted lower alkyl group.

Here, the dually reactive compounds mentioned above need to react with both of the starting material monomers of the condensation polymerization resins and the addition polymerization resins. When two or more starting material monomers of one polymerization reaction are used, a compound may be reactive with at least one of these starting material monomers.

In the general formula (I), with respect to the groups represented by $R^1$ to $R^6$, concrete examples of the halogen atoms include a fluorine atom, a chlorine atom, a bromine atom, and an iodine atom, with a particular preference given to the chlorine atom and the bromine atom. The alkyl groups, which may be linear or branched, have carbon atoms of preferably 1 to 6, particularly 1 to 4. Concrete examples thereof include a methyl group, an ethyl group, an n-propyl group, an i-propyl group, an n-butyl group, and a tert-butyl group. These alkyl groups may be substituted with such groups as a phenyl group, a naphthyl group, a hydroxyl group, a carboxyl group, an epoxy group, a prim-amino group, and a sec-amino group. Examples of the alkoxyl groups include a methoxy group, an ethoxy group, an n-propoxy group, an i-propoxy group, and a t-butoxy group, which may be substituted with such groups as a hydroxyl group, a carboxyl group, an epoxy group, a prim-amino group, and a sec-amino group. Examples of the aryl groups include a phenyl group, a naphthyl group, and a benzyl group, which may be substituted with such groups as a methyl group, an ethyl group, a methoxy group, an ethoxy group, a carboxyl group, a hydroxyl group, an epoxy group, a prim-amino group, and a sec-amino group. The vinyl group may be substituted with such groups as a hydroxyl group, a phenyl group, an alkyl group, an alkoxyl group, carboxyl group, an epoxy group, a prim-amino group, and a sec-amino group. The ring formed together by the groups represented by $R^1$ and $R^2$, or groups represented by $R^2$ and $R^3$ or groups represented by $R^4$ and $R^5$ may be substituted by such groups as a hydroxyl group, a carboxyl group, an epoxy group, a prim-amino group, and a sec-amino group.

Also, $R^7$ preferably represents a single bond or a lower alkylene group having 1 to 4 carbon atoms. $R^8$, $R^9$, and $R^{10}$ preferably each represents a hydrogen atom or a lower alkyl group having 1 to 4 carbon atoms, with greater preference given to the hydrogen atom. Examples of the lower alkyl groups having 1 to 4 carbon atoms include a methyl group and an ethyl group, and the alkyl groups may be substituted with such groups as a hydroxyl group, an epoxy group, a prim-amino group, and a sec-amino group.

Typical examples of the compounds represented by the general formula (I) include Compounds (1) to (38) shown below:

(1)　　　(2)　　　(3)

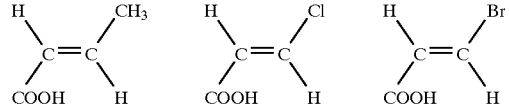

(4)　　　(5)　　　(6)

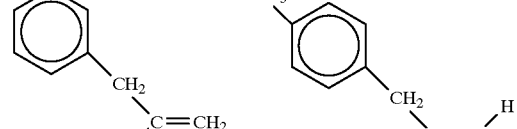

(7)　　　(8)

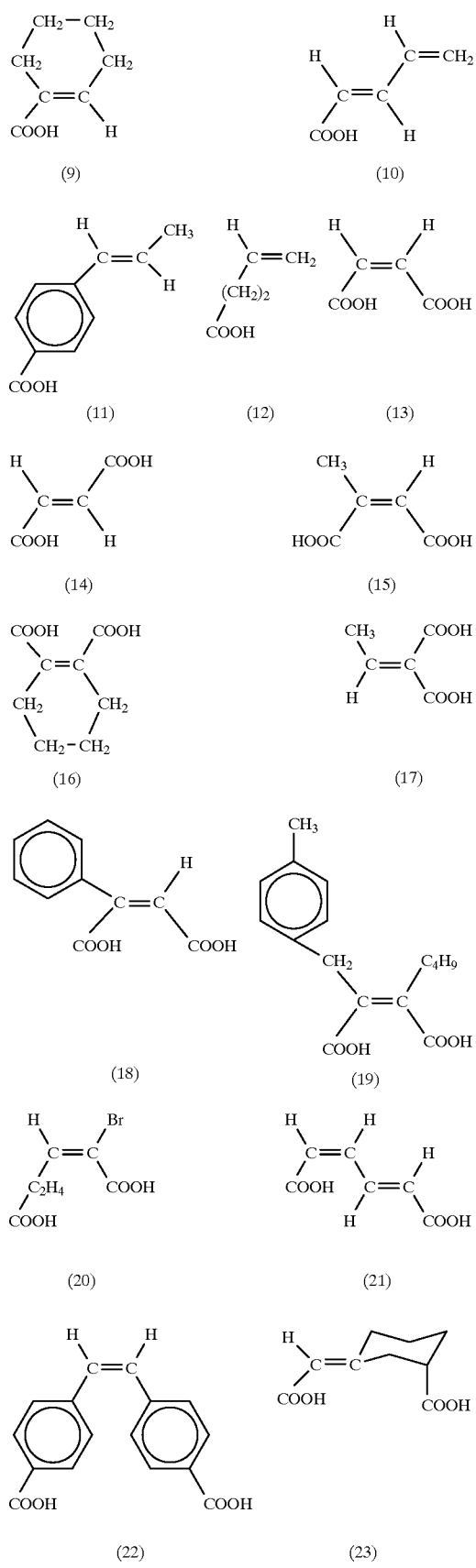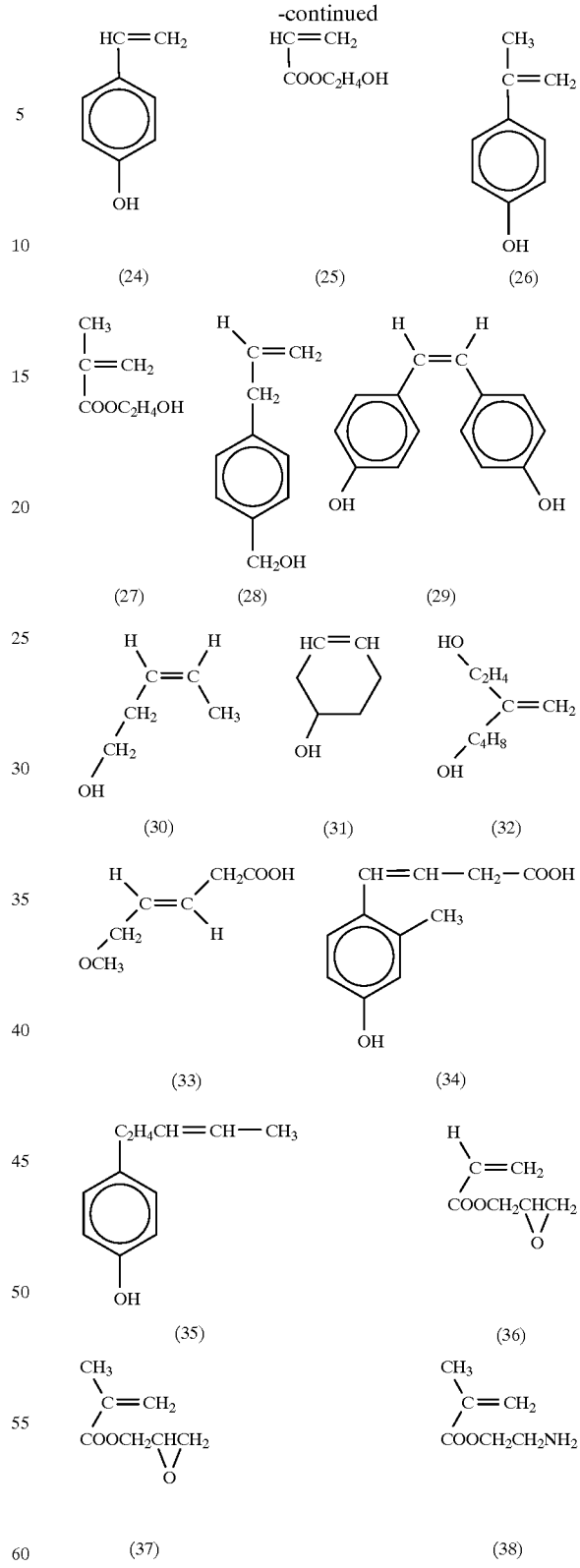
Besides the above compounds, lower alkyl esters of the above-exemplified ethylenic carboxylic acids, the alkyl group of alkyl esters having 1 to 4 carbon atoms, and anhydrides of the above-exemplified ethylenic carboxylic acids are also included.

The dually reactive compounds are added for the purpose of making small the particle size of the dispersed particles of the resin in the dispersed domain after the termination of the reaction to thereby improve the printing durability, and the amount thereof added to the entire starting material monomers is preferably from 0.5 to 10% by weight, more preferably from 0.5 to 5% by weight.

In the present invention, the binder further comprises a releasing agent (c) in addition to the starting material monomers of the two different polymerization resins and the dually reactive compound. The concrete examples of the releasing agents include polyolefin waxes, such as polypropylene waxes, polyethylene waxes, and polypropylene-polyethylene copolymer waxes; ester waxes, such as carnauba waxes, haze waxes, bees waxes, spermaceti, montan waxes; and amide waxes, such as fatty acid amide waxes. Among the above releasing agents, preference is given to polypropylene waxes, polyethylene waxes, polypropylene-polyethylene copolymer waxes, ester waxes, and amide waxes. Also, it is desired that the releasing agents have relatively low molecular weights, and particularly those having molecular weights of 500 to 15,000 as determined by the osmometric method are preferred. Also, it is desired that the releasing agents have softening points of from 70° to 160° C., preferably from 70° to 150° C. as determined by a differential scanning calorimeter ("DSC Model 210," manufactured by Seiko Instruments, Inc.) are preferred.

The amount of the releasing agent added, based on 100 parts by weight of a total amount of component (a) and component (b), is preferably from 0.1 to 1000 parts by weight, more preferably from 0.1 to 100 parts by weight, still more preferably from 0.1 to 20 parts by weight, still more preferably from 0.5 to 10 parts by weight. When the amount is equal to or greater than the lower limit specified above, the temperature of the low-temperature offset disappearance is lowered, and the temperature of the high-temperature offset initiation is raised. When the amount is equal to or lower than the upper limit specified above, the generation of filming to the photoconductor or spent carrier can be inhibited, thereby making it possible to form excellent fixed images.

In the present invention, since the releasing agents exemplified above are added in the process of the polymerization of the binder, the releasing agents can be uniformly dispersed in the binder, the releasing agent preferably having an average size of dispersed particles of 5 μm or less. When such a binder dispersed with a releasing agent is used for the preparation of toner, the particle size of the dispersed particles can be made even smaller, so that the releasing property of the resulting toner can be remarkably improved, thereby making it possible to suppress the adhesion of the toners to the photoconductor, to give a toner having excellent offset resistance.

Also, in conventional toners, it was difficult to improve dispersibility of the releasing agent because of the poor compatibility of the releasing agent blended in the making of toner. By contrast, in the present invention, the releasing agent can be blended during the preparation of binders, and by blending these wax components, the low-temperature fixing ability is further improved.

The binder of the present invention is obtained by a method comprising the steps of mixing the starting material monomer mixture, the dually reactive compound, and the releasing agent, and carrying out both of the two different polymerization reactions in one reaction vessel. In the present specification, in the step of "carrying out both of the two different polymerization reactions in one reaction vessel," both of the polymerization reactions may be concurrently carried out but they do not have to proceed or terminate at the same time, and the reaction temperature and time can be suitably selected so as to proceed or terminate each reaction according to each of the reaction mechanisms.

The polymerization reaction is, for example, carried out by the method comprising the steps of blending starting material monomers of condensation polymerization resin, starting material monomers of or addition polymerization resin, a dually reactive compound, a releasing agent, and a polymerization initiator for the vinyl resins under temperature conditions appropriate for the addition polymerization reaction; keeping the temperature of the obtained mixture under said temperature conditions to predominantly carry out addition polymerization to give an addition polymerization resin component having a functional group which can react in the condensation polymerization by radical polymerization reaction; and then raising the reaction temperature to form condensation polymerization resin components by predominantly carrying out condensation polymerization reaction.

Incidentally, the releasing agents give good corresponding effects when they are present in any of the polymerization processes even in small amounts. It is desired that the releasing agent is present at the initiation of polymerization, preferably at the initiation of the polymerization of the starting material monomers of the addition polymerization resin in order to give a further improved effect in the uniform dispersion of the releasing agent in the binder.

A typical example of preparing a binder comprises the steps of blending a mixture comprising starting material monomers of a vinyl resin, a dually reactive compound, and a polymerization initiator for the vinyl resin with a mixture comprising starting material monomers of polyesters, polyesteramides, or polyamides and a releasing agent under temperature conditions appropriate for the radical polymerization reaction, keeping the temperature of the obtained mixture under said temperature conditions to predominantly carry out radical polymerization to give a vinyl resin component having a functional group which can react in the condensation polymerization by radical polymerization reaction; and then raising the reaction temperature to form condensation polymerization resin components by predominantly carrying out condensation polymerization.

Here, although the temperature conditions appropriate for the addition polymerization reaction may vary depending upon the types of the polymerization initiators, they are usually 50° to 180° C., and the optimum temperature for increasing degree of the condensation polymerization is usually 190° to 270° C.

Since the binder can be effectively obtained by carrying out the two different polymerization reactions in an independent reaction path in one reaction vessel, the resulting binder has improved compatibility of the two different polymerization resins.

In the present invention, the weight ratio of the condensation polymerization resins to the addition polymerization resins or the weight ratio of the condensation polymerization resin monomers to the addition polymerization resin monomers is preferably in the range from 50/50 to 95/5, particularly from 60/40 to 95/5 from the aspect of giving good dispersibility of the addition polymerization resin.

It is desired that the binder obtained by the above method has a softening point, as determined by koka-type flow tester (manufactured by Shimadzu Corporation), of from 70° to 160° C., preferably 90° to 160° C. It is also desired that the binder has a glass transition temperature, as determined by a differential scanning calorimeter, which is ascribed to the two different polymerization resins, of from 40° to 90° C., preferably 45° to 80° C. It is desired that the binder has an acid value, as determined by the method according to JIS K 0070, of not more than 30 KOH mg/g, preferably not more than 25 KOH mg/g. The softening point, the glass transition temperature, and the acid value may be easily controlled to the above ranges by adjusting the amounts of the polymerization initiators and the catalysts in the starting material monomer mixture, or by selecting suitable reaction conditions.

In a toner comprising at least a binder and a colorant, the toner for developing an electrostatic image of the present invention is featured in that the binder of the present invention described above is contained as a binder component. The toner is prepared, for instance, by using the binder, the colorant, and optionally such additives as a charge control agent and a particulate magnetic material.

Examples of the colorants used in the present invention include various carbon blacks which may be produced by a thermal black method, an acetylene black method, a channel black method, and a lamp black method; a grafted carbon black, in which the surface of carbon black is coated with a resin; a nigrosine dye, Phthalocyanine Blue, Permanent Brown FG, Brilliant Fast Scarlet, Pigment Green B, Rhodamine-B Base, Solvent Red 49, Solvent Red 146, and Solvent Blue 35, and mixtures thereof. The colorant is usually used in an amount of about 1 to 15 parts by weight based on 100 parts by weight of the binder.

In the present invention, if necessary, as the charge control agents either the positive charge control agents or the negative charge control agents may be used. The positive charge control agents are not particularly limitative, and concrete examples thereof include nigrosine dyes such as "NIGROSINE BASE EX" (manufactured by Orient Chemical), "OIL BLACK BS" (manufactured by Orient Chemical), "OIL BLACK SO" (manufactured by Orient Chemical), "BONTRON N-01" (manufactured by Orient Chemical), "BONTRON N-07" (manufactured by Orient Chemical), and "BONTRON N-11" (manufactured by Orient Chemical); triphenylmethane dyes containing tertiary amines as side chains; quaternary ammonium salt compounds such as "BONTRON P-51" (manufactured by Orient Chemical), cetyltrimethylammonium bromide, and "COPY CHARGE PX VP435" (manufactured by Hoechst); polyamine resins such as "AFP-B" (manufactured by Orient Chemical); and imidazole derivatives such as "PLZ-2001" (manufactured by Shikoku Kasei K. K.) and "PLZ-8001" (manufactured by Shikoku Kasei K. K.), with a preference given to BONTRON N-07.

Negative charge control agents to be added are not particularly limitative, and concrete examples thereof include azo dyes containing metals such as "VARIFAST BLACK 3804" (manufactured by Orient Chemical), "BONTRON S-31" (manufactured by Orient Chemical), "BONTRON S-32" (manufactured by Orient Chemical), "BONTRON S-34" (manufactured by Orient Chemical), "BONTRON S-36" (manufactured by Orient Chemical), "T-77" (manufactured by Hodogaya Kagaku) and "AIZENSPILON BLACK TRH" (manufactured by Hodogaya Kagaku); copper phthalocyanine dye; metal complexes of alkyl derivatives of salicylic acid such as "BONTRON E-81" (manufactured by Orient Chemical), "BONTRON E-82" (manufactured by Orient Chemical), "BONTRON E-84" (manufactured by Orient Chemical), and "BONTRON E-85" (manufactured by Orient Chemical); and quaternary ammonium salts such as "COPY CHARGE NX VP434" (manufactured by Hoechst); nitroimidazole derivatives, with a preference given to BONTRON S-34, T-77, and AIZENSPILON BLACK TRH.

The above charge control agents may be added to the binder in an amount of preferably 0.1 to 8.0% by weight, more preferably 0.2 to 5.0% by weight.

Further, in the preparation of the toners, there may be added property improvers, for instance, fluidity improvers such as hydrophobic silica. When the binder described above is used for the preparation of the toners in the present invention, these property improvers are not necessary. Even if they are used, they are contained in a small amount.

The toners having an average particle size of 5 to 15 $\mu$m can be obtained by the method comprising steps of uniformly dispersing a binder, a colorant, and in certain cases, property improvers, melt-kneading the obtained mixture, cooling kneaded mixture, pulverizing the cooled mixture, and then classifying the pulverized product, all of the steps being carried out by known methods. The toners may be used as a nonmagnetic one-component developer. Alternatively, the toners may be blended with particulate magnetic materials such as iron oxide carriers, spherical iron oxide carrier or ferritic carriers, or the above carriers coated with a resin, to give a dry-type two-component developer.

A magnetic toner can be prepared by adding a particulate magnetic material to the binder obtained in the present invention. Examples of the particulate magnetic materials include ferromagnetic metals such as iron, i.e., ferrite or magnetite, cobalt, and nickel, alloys thereof, and compounds containing these elements; alloys not containing any ferromagnetic element which become ferromagnetic by suitable thermal treatment, for example, so-called "Heusler alloys" containing manganese and copper such as a manganese-copper-aluminum alloy, and a manganese-copper-tin alloy; and chromium dioxide, with a preference given to the compounds containing ferromagnetic materials, and a particular preference to magnetite. It is desired that such a particulate magnetic material is uniformly dispersed in the toner in the form of a fine powder having an average particle size of 0.1 to 1 $\mu$m. It is desired that the content of these particulate magnetic materials is from 20 to 70 parts by weight, preferably 30 to 70 parts by weight, based on 100 parts by weight of the binder.

Since the binder of the present invention is included in the toner for electrostatic development, the resulting toner has excellent low-temperature fixing ability and offset resistance and is fixable at a low temperature without using an offset inhibiting liquid even when carrying out high-speed fixing in a heat roller method.

EXAMPLES

The present invention will be hereinafter described in more detail by means of the following working examples, without intending to restrict the scope of the present invention thereto.

The measurements for the acid values and the glass transition temperature (Tg) of each of the resulting binders were carried out under the conditions given below.
Acid Value
 Measured by a method according to JIS X0070.
Glass Transition Temperature (Tg)
 The glass transition temperature (Tg) refers to the temperature of an intersection of the extension of the baseline of not more than the glass transition temperature and the tangential line showing the maximum inclination between the kickoff of the peak and the top thereof as determined with a sample using a differential scanning calorimeter ("DSC Model 210," manufactured by Seiko Instruments, Inc.), at a heating rate of 10° C./min. The sample is treated before measurement using the DSC by raising its temperature to 200° C., keeping at 200° C. for 3 minutes, and cooling the hot sample at a cooling rate of 10° C./min. to room temperature.

Also, the measurement for the particle size of the dispersed particles of the releasing agent in the resulting binder was measured as follows.

Particle Size of Dispersed Particles

The particle size of the dispersed particles can be measured by the method comprising the steps of slicing the resin having a particle size of 0.2 mm using a microtome to a thickness of 150 nm, observing the obtained thin slices using a transmission scanning electron microscope ("JEM-2000," manufactured by JEOL (Nihon Denshi Kabushiki Kaisha)), and then analyzing observed images by a known method.

Example 1

In a dropping funnel, 665 g of styrene and 127 g of 2-ethylhexyl acrylate as monomers for forming vinyl resins, and 32 g of dicumyl peroxide as a polymerization initiator were placed. A five-liter four-necked glass flask equipped with a thermometer, a stainless steel stirring rod, a reflux condenser, and a nitrogen inlet tube was charged with 1444 g of polyoxypropylene(2.2)-2,2-bis(4-hydroxyphenyl) propane, 47 g of isododecenyl succinic anhydride, 378 g of terephthalic acid, and 135 g of 1,2,4-benzenetricarboxylic acid as monomers for forming polyester resins, 40 g of fumaric acid as a dually reactive compound, 5 g of dibutyltin oxide as an esterification catalyst, and 144 g of a polypropylene wax ("VISCOL 550P," manufactured by Sanyo Chemical Industries, Ltd.; number-average molecular weight determined by vapor pressure osmosis method: 4000) as a releasing agent, the polypropylene wax having a softening point of 149° C. as determined by differential scanning calorimeter ("DSC 210" manufactured by Seiko Instruments, Inc.). Here, the polypropylene wax was added in an amount of 5 parts by weight based on 100 parts by weight of the entire starting material monomers. While stirring the contents in the glass flask at 160° C., the mixture of the monomers for forming the vinyl resins and the polymerization initiator was added dropwise from the above dropping funnel to the contents in the glass flask over a period of one hour while heating the contents in a mantle heater in a nitrogen gas atmosphere. The reaction mixture obtained by addition polymerization was matured for two hours while keeping the temperature at 160° C., and then the temperature was elevated to 230° C. to allow the condensation polymerization reaction to take place.

The degree of polymerization was monitored from a softening point measured by the method according to ASTM E 28-67 using a koka-type flow tester (manufactured by Shimadzu Corporation), and the reaction was terminated when the softening point reached 135° C.

The resulting resin had a glass transition temperature (Tg) ascribed to two different polymerization resins of 61.5° C. and also a glass transition temperature (Tg) ascribed to the releasing agent of 148.0° C. The resulting resin had an acid value of 9.5 KOH mg/g.

This resulting resin is referred to as "Binder A." The particle size of the dispersed particles of the releasing agent in Binder A was 1.5 μm.

Example 2

In a dropping funnel, 480 g of styrene and 85 g of butyl acrylate, as monomers for forming vinyl resins, 20 g of acrylic acid as a dually reactive compound, and 23 g of dicumyl peroxide as a polymerization initiator were placed. A five-liter four-necked glass flask equipped with a thermometer, a stainless steel stirring rod, a reflux condenser, and a nitrogen inlet tube was charged with 980 g of polyoxypropylene(2.2)-2,2-bis(4-hydroxyphenyl) propane, 228 g of polyoxyethylene(2.2)-2,2-bis(4-hydroxyphenyl)propane, 200 g of isododecenyl succinic anhydride, 248 g of terephthalic acid, and 144 g of 1,2,4-benzenetricarboxylic acid as monomers for forming polyester resins, 5 g of dibutyltin oxide as an esterification catalyst, and 121 g of a polyethylene wax ("SPRAY 105," manufactured by Sazole; number-average molecular weight determined by vapor pressure osmosis method: 1100) as a releasing agent, the polyethylene wax having a softening point of 105° C. as determined by differential scanning calorimeter ("DSC 210" manufactured by Seiko Instruments, Inc.). Here, the polyethylene wax was added in an amount of 5 parts by weight based on 100 parts by weight of the entire starting material monomers. While stirring the contents in the glass flask at 160° C., the mixture of the monomers for forming the vinyl resins, the dually reactive compound, and the polymerization initiator was added dropwise from the above dropping funnel to the contents in the glass flask over a period of one hour while heating the contents in a mantle heater in a nitrogen gas atmosphere. The reaction mixture obtained by addition polymerization was matured for two hours while keeping the temperature at 160° C., and then the temperature was elevated to 230° C. to allow the condensation polymerization reaction to take place.

The degree of polymerization was monitored from a softening point measured by the method according to ASTM E 28-67 using a koka-type flow tester (manufactured by Shimadzu Corporation), and the reaction was terminated when the softening point reached 132° C.

The resulting resin had a glass transition temperature (Tg) ascribed to two polymerization resins of 58.5° C. and also a glass transition temperature (Tg) ascribed to the releasing agent of 95.0° C. The resulting resin had an acid value of 23.3 KOH mg/g.

This resulting resin is referred to as "Binder B." The particle size of the dispersed particles of the releasing agent in Binder B was 2 μm.

Example 3

The same procedures as in Example 2 were carried out except for using an ester wax (carnauba wax, manufactured by Sazole; number-average molecular weight determined by vapor pressure osmosis method: 800) as a releasing agent, the ester wax having a softening point of 83° C. as determined by differential scanning calorimeter ("DSC 210" manufactured by Seiko Instruments, Inc.) in place of the polyethylene wax in Example 2. The reaction was terminated when the softening point measured by the method according to ASTM E 28-67 using a koka-type flow tester (manufactured by Shimadzu Corporation) reached 125° C.

The resulting resin had a glass transition temperature (Tg) with a single peak at 52.3° C. The resulting resin had an acid value of 21.5 KOH mg/g.

This resulting resin is referred to as "Binder C." In this example, the ester wax was used as a releasing agent. Since the ester wax has a high compatibility with the resin, the resulting binder had a single glass transition temperature peak. Therefore, in Binder C, a granular releasing agent was not observed.

19

Comparative Example 1

The same procedures as in Example 1 were carried out without using a polypropylene wax as in Example 1, to give a resin.

The resulting resin had a glass transition temperature (Tg) with a single peak at 61.5° C. The resulting resin had an acid value of 9.8 KOH mg/g.

This resulting resin is referred to as "Binder D."

Comparative Example 2

The same procedures as in Example 2 were carried out without using a polyethylene wax as in Example 2, to give a resin.

The resulting resin had a glass transition temperature (Tg) with a single peak at 59.0° C. The resulting resin had an acid value of 22.5 KOH mg/g.

This resulting resin is referred to as "Binder E."

Example 4

In a dropping funnel, 300 g of styrene and 55 g of 2-ethylhexyl acrylate, as monomers for forming vinyl resins, 15 g of acrylic acid as a dually reactive compound, and 15 g of di-tert-butyl peroxide as a polymerization initiator were placed. A five-liter four-necked glass flask equipped with a thermometer, a stainless steel stirring rod, a reflux condenser, and a nitrogen inlet tube was charged with 720 g of polyoxypropylene(2.2)-2,2-bis(4-hydroxyphenyl) propane, 295 g of polyoxyethylene(2.2)-2,2-bis(4-hydroxyphenyl)propane, 258 g of isododecenyl succinic anhydride, 145 g of terephthalic acid, and 132 g of 1,2,4-benzenetricarboxylic acid as monomers for forming polyester resins, 4 g of dibutyltin oxide as an esterification catalyst, and 970 g of the polyethylene wax used in Example 2 as a releasing agent ("SPRAY 105," manufactured by Sazole). Here, the polyethylene wax was added in an amount of 50' parts by weight based on 100 parts by weight of the entire starting material monomers. While stirring the contents in the glass flask at 160° C., the mixture of the monomers for forming the vinyl resins, the dually reactive compound, and the polymerization initiator was added dropwise from the above dropping funnel to the contents in the glass flask over a period of one hour while heating the contents in a mantle heater in a nitrogen gas atmosphere. The reaction mixture obtained by addition polymerization was matured for two hours while keeping the temperature at 160° C., and then the temperature was elevated to 230° C. to allow the condensation polymerization reaction to take place.

The degree of polymerization was monitored from a softening point measured by the method according to ASTM E 28-67 using a koka-type flow tester (manufactured by Shimadzu Corporation), and the reaction was terminated when the softening point reached 120° C.

The resulting resin had a glass transition temperature (Tg) ascribed to two polymerization resins of 53.5° C. and also a glass transition temperature (Tg) ascribed to the releasing agent of 93.2° C. The resulting resin had an acid value of 21.5 KOH mg/g.

This resulting resin is referred to as "Binder F." The particle size of the dispersed particles of the releasing agent in Binder F was 4 μm.

Test Example 1

Each of the materials having the composition shown in Table 1 was blended with a Henschel mixer in advance, and the obtained mixture was melt-blended using a double-screw extruder. After cooling the extruded product, the cooled product was pulverized and classified to give each of untreated toners 1 to 8 having an average particle size of 11 μm.

TABLE 1

| | Toner Composition | | | | | | | |
|---|---|---|---|---|---|---|---|---|
| | Untreated Toners (Parts by Weight) | | | | | | | |
| | 1 | 2 | 3 | 4 | 5 | 6 | 7 | 8 |
| Binder A | 105 | | | 105 | | | | |
| B | | 105 | | | | | | |
| C | | | 105 | | | | | |
| D | | | | | | 100 | | |
| E | | | | | | | 100 | 100 |
| F | | | | | 100 | | | |
| Carbon Black "#44" | 7 | 7 | 7 | 7 | 7 | 7 | 7 | 7 |
| BONTRON S-34 | 2 | 2 | 2 | | 2 | 2 | 2 | 2 |
| BONTRON N-07 | | | | 2 | | | | |
| Polypropylene Wax "VISCOL 550P" | | | | | | 5 | | |
| Polyethylene Wax "SPRAY 105" | | | | | | | 5 | 2 |

Each of the obtained untreated toners 1 to 5 was subjected to a surface treatment by blending 100 parts by weight of each untreated toner with 0.1 parts by weight of hydrophobic silica "H-2000" (manufactured by Wacker Chemical Co.) using a Henschel mixer, to give Toners 1 to 5. Similarly, each of the untreated toners 6 to 8 were subjected to a surface treatment, to give Comparative Toners 1 to 3.

A developer was prepared by blending 39 parts by weight of each of the toners with 1261 parts by weight of spherical ferrite powder coated with styrene-methyl methacrylate resin, the ferrite powder having an average particle size of 100 μm. Specifically, each of the developers prepared as described above was loaded on a commercially available electrophotographic copy machine to form images. Here, the copy machine was equipped with an amorphous selene photoconductor for Toners 1, 2, 3, and 5, Comparative Toners 1, 2, and 3, or an organic photoconductor for Toner 4; and a fixing roller having a rotational speed of 255 mm/sec. A fixing device thereof was set at variable heat roller temperature and an oil applying device was removed therefrom.

The fixing ability, the image density, the offset resistance and the printing durability were evaluated by the following methods.

(1) Fixing ability of the toners

The fixing ability is evaluated by determining the lowest fixing temperature.

The lowest fixing temperature used herein is the temperature of the fixing roller at which the fixing ratio of the toner exceeds 70%. This fixing ratio of the toner is determined by placing a load of 500 g on a sand-rubber eraser (LION No. 502) having a bottom area of 15 mm×7.5 mm which contacts the fixed toner image, placing the loaded eraser on a fixed toner image obtained in the fixing device, moving the loaded eraser on the image backward and forward five times, measuring the optical reflective density of the eraser-treated image with a reflective densitometer manufactured by Macbeth Co., and then calculating the fixing ratio from this density value and a density value before the eraser treatment using the following equation.

$$\text{Fixing ratio (\%)} = \frac{\text{Image density after eraser treatment}}{\text{Image density before eraser treatment}} \times 100$$

By controlling the fixing temperature from 100° C. to 240° C., the fixing ability of the formed images are evaluated. The results are shown in Table 2.

(2) Image Density

The optical reflective density of the fixed images formed in the temperature range in which fixing is sufficiently achieved without causing offset phenomenon was measured using a Macbeth reflective densitometer "RD-914" (manufactured by Macbeth Process Measurements Co.). The results are shown in Table 2.

(3) Offset resistance

The offset resistance is evaluated by measuring the temperature of the low-temperature offset disappearance and the temperature of the high-temperature offset initiation. Specifically, copying tests are carried out by raising the temperature of the heat roller surface at an increment of 5° C. in the range from 70° to 240° C., and at each temperature, the adhesion of the toner onto the heat roller surface is observed by gross examination. The results are shown in Table 2.

TABLE 2

Evaluation of Fixing Ability

| | Image Density | Lowest Fixing Temp. (°C.) | Low-Temp. Offset Disappearance Temp. (°C.) | High-Temp. Offset Initiation Temp. (°C.) |
|---|---|---|---|---|
| Toner 1 | 1.45 | 118 | 115 | 240< |
| Toner 2 | 1.43 | 115 | 112 | 246< |
| Toner 3 | 1.48 | 110 | 105 | 240< |
| Toner 4 | 1.45 | 117 | 115 | 240< |
| Toner 5 | 1.43 | 105 | 99 | 240< |
| Comparative Toner 1 | 1.41 | 122 | 118 | 240< |
| Comparative Toner 2 | 1.40 | 120 | 118 | 240< |
| Comparative Toner 3 | 1.46 | 125 | 123 | 190 |

(4) Printing durability of the toner

The printing durability is evaluated by conducting copying test for 500,000 sheets under normal conditions of 23° C. and 50%RH or under high-temperature, high-humidity conditions of 35° C. and 85%RH and observing the changes in the triboelectric charge and the occurrence of background obtained during the printing durability test.

The triboelectric charge is measured by a blow-off type electric charge measuring device equipped with a Faraday cage, a capacitor and an electrometer as described below. First, W (g) (about 0.15 to 0.20 g) of the developer prepared above is placed into a brass measurement cell equipped with a stainless screen of 500 mesh, which is adjustable to any mesh size to block the passing of the carrier particles. Next, after aspirating from a suction opening for 5 seconds, blowing is carried out for 5 seconds under a pressure indicated by a barometric regulator of 0.6 kgf/cm², thereby selectively removing only the toner from the cell.

In this case, the voltage of the electrometer after 2 seconds from the start of blowing is defined as V (volt). Here, when the electric capacitance of the capacitor is defined as C ($\mu$F), the triboelectric charge Q/m of this toner can be calculated by the following equation:

$$Q/m(\mu C/g) = C \times V/m$$

Here, m is the weight of the toner contained in W (g) of the developer. When the weight of the toner in the developer is defined as T (g) and the weight of the developer as D (g), the toner concentration in a given sample can be expressed as T/D×100(%), and m can be calculated as shown in the following equation:

$$m(g) = W \times (T/D)$$

The results are shown in Table 3.

TABLE 3

Evaluation of Printing Durability

| | | Changes in Triboelectric Charge After Printing 500,000 sheets ($\mu$C/g) | | Image Quality | |
|---|---|---|---|---|---|
| | Triboelectric Charge at Start ($\mu$C/g) | Under Normal Conditions 23° C., 50% RH | Under High-Temp., High-Humidity Conditions 35° C., 85% RH | Under Normal Conditions 23° C., 50% RH | Under High-Temp., High-Humidity Conditions 35° C., 85% RH |
| Toner 1 | −17.6 | 0 | +1 | Excellent up to 500,000 sheets | Excellent up to 500,000 sheets |
| Toner 2 | −18.8 | +1 | +3 | Excellent up to 500,000 sheets | Excellent up to 500,000 sheets |

TABLE 3-continued

Evaluation of Printing Durability

| | Triboelectric Charge at Start ($\mu$C/g) | Changes in Triboelectric Charge After Printing 500,000 sheets ($\mu$C/g) | | Image Quality | |
|---|---|---|---|---|---|
| | | Under Normal Conditions 23° C., 50% RH | Under High-Temp., High-Humidity Conditions 35° C., 85% RH | Under Normal Conditions 23° C., 50% RH | Under High-Temp., High-Humidity Conditions 35° C., 85% RH |
| Toner 3 | −20.5 | −1 | +3 | Excellent up to 500,000 sheets | Excellent up to 500,000 sheets |
| Toner 4 | +21.2 | 1 | −1 | Excellent up to 500,000 sheets | Excellent up to 500,000 sheets |
| Toner 5 | −19.5 | 0 | 0 | Excellent up to 500,000 sheets | Excellent up to 500,000 sheets |
| Comparative Toner 1 | −17.7 | +10 | +15 | Background at 10,000 sheets | Background at 3,000 sheets |
| Comparative Toner 2 | −19.5 | +8 | +10 | Background at 20,000 sheets | Background at 5,000 sheets |
| Comparative Toner 3 | −19.3 | +2 | +4 | Excellent up to 500,000 sheets | Excellent up to 500,000 sheets |

As is clear from Tables 2 and 3, all of the toners according to the present invention have remarkably good fixing ability of the formed images and offset resistance. Also, in the durability printing test, substantially no changes take place in the triboelectric charges under the normal conditions of 23° C. and 50%RH and under the high-temperature, high-humidity conditions of 35° C. and 85%RH take place, thereby providing good image quality. By contrast, however, in cases of Comparative Toners 1 and 2 where no binders are used, the printing durability is deficient though having good hot offset resistance. In the case of Comparative Toner 3, the hot offset resistance is poor though having good printing durability.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A binder obtained by a process comprising the steps of:
   mixing components (a) to (c):
   (a) a starting material monomer mixture of two different polymerization reactions, each of the polymerization reactions being carried out in an independent reaction path;
   (b) a compound which can react with both of the starting material monomers of the two different polymerization reactions; and
   (c) a releasing agent; and
   carrying out both of the two different polymerization reactions in one reaction vessel.

2. The binder according to claim 1, wherein said two different polymerization reactions are respectively reactions for preparing a condensation polymerization resin and an addition polymerization resin.

3. The binder according to claim 1, wherein said component (b) is a compound having an ethylenic unsaturated bond and at least one functional group selected from the group consisting of a hydroxyl group, a carboxyl group, an epoxy group, a primary amino group, and a secondary amino group.

4. The binder according to claim 3, wherein said component (b) is represented by the general formula (I):

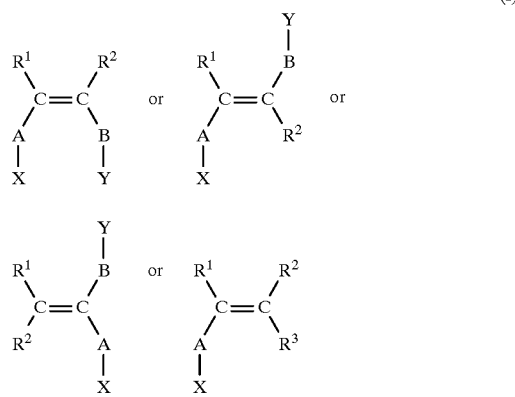

(I)

wherein $R^1$, $R^2$ and $R^3$, which may be identical or different, each is selected from the group consisting of a hydrogen atom, a hydroxyl group, a halogen atom, an alkyl group, an alkoxyl group, an aryl group, and a vinyl group, or wherein $R^1$ and $R^2$ or $R^2$ and $R^3$ may together form a ring, each of the alkyl group, the alkoxyl group, the aryl group, the vinyl group, or the ring being substituted or unsubstituted; A and B, which may be identical or different, each is selected from the group consisting of a single bond, an alkylene group represented by the following general formula (II), and a phenylene group represented by the following general formula (III):

(II)

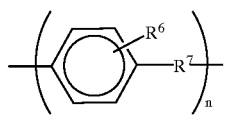
(III)

wherein $R^4$, $R^5$ and $R^6$, which may be identical or different, each is selected from the group consisting of a hydrogen atom, a hydroxyl group, a halogen atom, an alkyl group, an alkoxyl group, an aryl group, and a vinyl group, or wherein $R^4$ and $R^5$ may together form a ring, each of the alkyl group, the alkoxyl group, the aryl group, the vinyl group, or the ring being substituted or unsubstituted; $R^7$ is a single bond or a lower alkylene group; m is an integer of 0 to 5; and n is an integer of 0 to 2, and wherein X and Y, which may be identical or different, each is selected from the group consisting of —$R^6$, —$OR^9$, and —$COOR^{10}$, wherein $R^8$, $R^9$, and $R^{10}$ each is selected from the group consisting of a hydrogen atom and a substituted or unsubstituted lower alkyl group.

5. The binder according to claim 1, wherein said releasing agent is at least one member selected from the group consisting of polypropylene waxes, polyethylene waxes, polypropylene-polyethylene copolymer waxes, ester waxes, and amide waxes.

6. The binder according to claim 1, wherein said releasing agent has a softening point of from 70° to 160° C.

7. The binder according to claim 1, wherein said releasing agent is used in an amount of 0.1 to 1000 parts by weight, based on 100 parts by weight of a total amount of said components (a) and (b).

8. The binder according to claim 1, wherein said binder has an acid value of 30 KOH mg/g or less.

9. The binder according to claim 1, wherein said binder has a softening point of from 70° to 160° C.

10. A toner for developing an electrostatic image comprising the binder of any one of claims 1 to 9.

\* \* \* \* \*